US008374898B2

(12) United States Patent
El-Bakry et al.

(10) Patent No.: US 8,374,898 B2
(45) Date of Patent: Feb. 12, 2013

(54) BULK MATERIAL SHIP ROUTING AND INVENTORY MANAGEMENT SCHEDULE OPTIMIZATION

(75) Inventors: Amr S. El-Bakry, Bedminster, NJ (US); Jin-Hwa Song, Whitehouse Station, NJ (US); Vikas Goel, Houston, TX (US); Kevin C. Furman, Houston, TX (US); Federico D. Carvallo, Sugar Land, TX (US); Sangbum Lee, Fairfax, VA (US); James Dreher, Houston, TX (US); Aristides Miroyannis, Houston, TX (US); Richard Perry Connell, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 652 days.

(21) Appl. No.: 12/584,239

(22) Filed: Sep. 1, 2009

(65) Prior Publication Data

US 2010/0088142 A1    Apr. 8, 2010

Related U.S. Application Data

(60) Provisional application No. 61/191,161, filed on Sep. 5, 2008.

(51) Int. Cl.
*G06Q 10/00* (2012.01)
(52) U.S. Cl. ...................... 705/7.11; 705/7.12
(58) Field of Classification Search ............... None
See application file for complete search history.

(56) References Cited

U.S. PATENT DOCUMENTS

| | | | |
|---|---|---|---|
| 6,850,898 B1 | 2/2005 | Murakami et al. | |
| 7,463,937 B2 * | 12/2008 | Korchinski | 700/31 |
| 7,797,205 B2 * | 9/2010 | Song et al. | 705/28 |
| 7,848,944 B1 * | 12/2010 | Anbil | 705/7.12 |
| 8,019,617 B2 * | 9/2011 | Kocis et al. | 705/1.1 |
| 2002/0062157 A1 | 5/2002 | Sugimoto et al. | |
| 2002/0069210 A1 * | 6/2002 | Navani et al. | 707/104.1 |
| 2002/0138293 A1 | 9/2002 | Kawahara et al. | |
| 2003/0208392 A1 | 11/2003 | Shekar et al. | |
| 2006/0015396 A1 * | 1/2006 | Blomeyer | 705/13 |
| 2007/0186564 A1 | 8/2007 | Hubbard et al. | |
| 2007/0214031 A1 * | 9/2007 | Amano | 705/8 |
| 2008/0004928 A1 * | 1/2008 | Trellevik et al. | 705/7 |
| 2008/0077464 A1 * | 3/2008 | Gottlieb et al. | 705/8 |
| 2008/0294484 A1 * | 11/2008 | Furman et al. | 705/8 |
| 2009/0187450 A1 * | 7/2009 | Kocis et al. | 705/8 |

OTHER PUBLICATIONS

Brown GG, Graves GW and Ronen D (1987). Scheduling Ocean Transportation of Crude Oil. Management Science. 33(3): 335-346.*
Fagerholt (2004). A computer-based decision support system for vessel fleet scheduling—Experience and future research. Decision Support Systems 2004; 37: 35-47.* Hoff A Gribkovskaia I, Laporte G and Lokketangen A (2009; Available online Oct. 22, 2007). Discrete Optimization Lasso solution strategies for the vehicle routing problem with pickups and deliveries. European Journal of Operational Research 192 (2009) 755-766.*
Bronmo, G. & Lokketangen, A. (2007). An adaptive constructive solution generator for ship scheduling DSS. Presented at NIK 2007 conference, Osio. 1-12.*
Gerardo Berbeglia, Jean-François Cordeau, Irina Gribkovskaia, Gilbert Laporte (2007). Static pickup and delivery problems: a classification scheme and survey. Sociedad de Estadistica e Investigación Operativa. 15:1-31.*

* cited by examiner

*Primary Examiner* — Lynda Jasmin
*Assistant Examiner* — Brett Feeney
(74) *Attorney, Agent, or Firm* — Ronald Hartman; David Weisberg

(57) ABSTRACT

The present invention is a computational system to generate feasible marine transportation schedules given a proposed bulk material supply chain. The decision support tool will fulfill the objectives and scope defined above. The technology employed will require (a) the use of mathematical programming modeling techniques (mixed integer linear programming) to mathematically formulate the business problem, and (b) advanced proprietary solution methods to produce solutions satisfying all constraints of the mathematical model while optimizing an objective function. The decision support tool has the following capabilities: Read input data, Generate feasible bulk material ship Schedule, Evaluate bulk material ship Schedule with User-defined Objective Function, Allow Case comparison, Graphical user interface (GUI) for specifying input data and displaying results.

11 Claims, 11 Drawing Sheets

FIG. 5

```
LASSO 1.0
File Edit View Data Run Settings Tools Window Help

Inv_LNGCon  Inv_RegasCon
Type         Constraint
Identifier   Inv_RegasCon
Index domain (rr,t)
Text
Unit
Property
Definition   inv_Regas(rr,t)
             = inv_Regas(rr,t-1)$(t>firstDayOfPlanningHorizon)
             + InitialInv_Regas(rr)$(t=firstDayOfPlanningHorizon)
             - regasRate(rr,t)
             + shortage_Regas(rr,t)
             + sum((sh,ll)| (
                            (ord(t) <= NumberOfOutgoingArcsDbyl(rr,ll) ) and
                            (ArcOnAndOff(sh,Arc_fromRegas(rr,ll,t) )=1)
                           ), DischargeCapacity(sh)* x(sh,Arc_fromRegas(rr,ll,t) ) )
             + sum( (sh)| (
                           (ArcOnAndOff(sh,Arc_fromRegasToSNK(rr,t))=1)
                          ), DischargeCapacity(sh)* x(sh,Arc_fromRegasToSNK(rr,t)) )

Comment
LASSO.prj Act.Case:                                                    READY
```

BULK MATERIAL SHIP ROUTING AND INVENTORY MANAGEMENT SCHEDULE OPTIMIZATION

This Application claims the benefit of U.S. Provisional Application 61/191,161 filed Sep. 5, 2008.

BACKGROUND OF THE INVENTION

The present invention relates to a method and system for determining bulk materials schedules for delivery from bulk material supply terminals to bulk material demand terminals. In particular, the invention determines a schedule that meets predetermined objectives. Further this invention can also be used to evaluate the attractiveness of design in a planning method for design of a bulk material ship routing and inventory management supply chain. The present invention can be used to optimize the transportation and the distribution schedule of any bulk material, even industrial gases. The present invention may be applied to many transportation scenarios and is not limited to any particular mode of transportation. Non-limiting examples of modes of transport to which the system and method can be applied include ships, trucks, barges, railcars, and airplanes. The vessels may be homogeneous or heterogeneous. Invention provides capabilities to model seasonality in regas rates and optimization of initial ship location and terminal inventories. Invention provides capabilities to optimize schedule in the presence of system interruptions (such as planned events/maintenance) and system uncertainties such as unplanned events (e.g. weather conditions, ship and berth unplanned maintenance). The invention optimizes both dedicated and spot vessels.

In one embodiment, the invention optimizes the transportation and distribution of liquid bulk material in a heterogeneous fleet of ships.

SUMMARY OF THE INVENTION

The present invention provides an optimization system and method to generate feasible marine transportation and bulk material distribution schedules for a given bulk material supply chain. The system can be used to optimize the transportation and the distribution schedule of any bulk material. These bulk materials may include refinery feedstocks, GTL, vacuum gas oil (VGO), fuel oil, ammonia, cement, animal fodder. An objective of the present invention is to plan and schedule bulk material distribution for the transportation of bulk materials from supply terminals to demand terminals so that the supply terminals do not have any over-supply and the demand terminals do not have an undersupply. The steps of the method include obtaining input data specifying the requirements to be satisfied for the marine transportation schedule to meet predetermined objectives, determining a feasible schedule from the input data, evaluating said feasible schedule to determine how well the schedule meets the predetermined objectives and iterating the feasible schedule by adjusting the input data to minimize deviations from the predetermined objectives.

The invention will be illustrated by a preferred embodiment wherein the bulk material is liquid natural gas (LNG) which is transferred from LNG terminals to Re-gasification (Regas) terminals (referred to a LASSO, see appendix). The optimization system comprises a mathematical model containing a mathematical programming formulation. An objective function of the mathematical model is to minimize lost production due to tank tops at LNG terminals and stockouts due to tank bottoms at Regas terminals. The model contains constraints that account for marine transportation scheduling and inventory management. The model also accounts for LNG production schedules at LNG terminals and re-gasification or consumption requirements at Regas terminals such that LNG production schedules and re-gasification schedules are not required to be constant over time. Re-gasification schedules can be either given or controllable within a given interval. The system evaluates the robustness of a ship schedule in the face of unplanned events. This enables evaluation of how well the LNG supply chain will be able to recover from various unplanned events.

The system finds acceptable feasible solutions, near optimal solutions or an optimal solution. In the end, the system reports an Annual Delivery Plan (ADP) or a delivery plan for a given period that is better than those the user may have generated by other means. Use of the system also allows the user to perform "what-if" analyses. Through "what-if" analyses, the users can see the impact of changes in supply chain design and optimize it. In this capacity the optimization system is used in a method for the design of a supply chain on a planning basis. LNG supply chain design includes but is not limited to making decisions regarding the size and number of storage capacities at LNG and Regas terminals, number of berths, size of the fleet of ships, sizes and specifications of individual ships, etc. The attractiveness of a schedule found by the optimization tool can be evaluated and used to support supply chain design decisions. A generated delivery plan can also be used as an operational plan for ship scheduling.

As stated above, the system can be used to optimize the transportation and the distribution schedule of any bulk material, even industrial gases. The optimization system and method of the current invention may be applied to many transportation scenarios and is not limited to any particular mode of transportation. Non-limiting examples of modes of transport to which the system and method can be applied include ships, trucks, barges, railcars, and airplanes. The vessels may be homogeneous or heterogeneous. In one preferred embodiment, the system optimizes the transportation and distribution of liquid bulk material in a heterogeneous fleet of ships.

Generally, the optimization system formulates the business problem as a mathematical model to be solved with a mathematical optimization engine or a specialized algorithm. The system provides a solution that minimizes the objective function based on some type of performance measure. A suitable performance measure may be any type, including, but not limited to, the following types: (i) minimize lost production at production sites (LNG terminals); (ii) minimize stockouts at consumption sites (Regas terminals); (iii) minimize unmet demand; (iv) maximize inventory levels at Regas terminals (v) minimize inventory levels at LNG terminals; (vi) minimize deviation of re-gasification rate from the target; (vii) minimize transportation costs; (viii) maximize profit; (ix) minimize the size of fleet; and (x) any combination thereof.

BRIEF DESCRIPTION OF THE DRAWINGS

FIG. 5 shows AIMMS Implementation of regas terminal inventory update constraints.

DETAILED DESCRIPTION OF THE INVENTION

The preferred embodiment will be described in which the bulk material is LNG.

The decision support system has the following capabilities: read input data, generate feasible LNG ship Schedule, evaluate LNG ship Schedule with User-defined Objective Function, allow Case comparison, and graphical user interface (GUI) for specifying input data and displaying results.

The invention includes a computational system to generate feasible marine transportation schedules given a proposed LNG supply chain. The decision support system will fulfill the objectives and scope defined above. The technology employed will require (a) the use of mathematical programming modeling techniques (mixed integer linear programming) to mathematically formulate the business problem, and (b) advanced proprietary solution methods to produce solutions satisfying all constraints of the mathematical model while optimizing an objective function.

Figure 1:
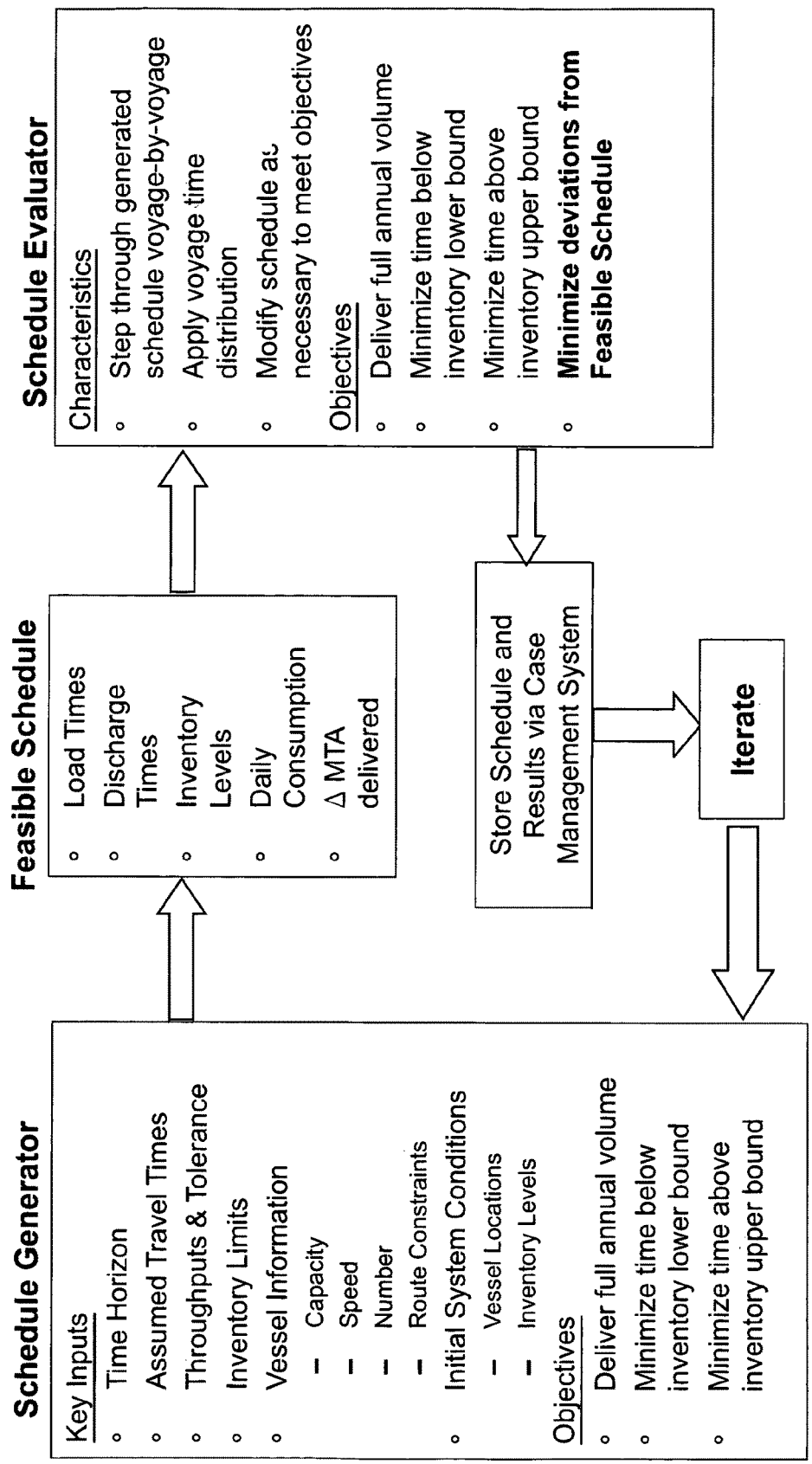
FIG. 1 shows a schematic drawing of the scheduling system of the present invention.

FIG. 1 represents a conceptual drawing for the supply chain design planning method including the scheduling system within the larger scope of an overall system for schedule development and evaluation. The Schedule Generator uses input data including (a) time horizon for scheduling, (b) travel times for ships between different locations, which are not required to be constant over the entire time horizon, (c) throughputs and tolerance, (d) inventory limits or capacities at both production (LNG) and consumption (re-gas) terminals, (e) transport vessel information including capacity, speed, and number of each class of vessel, (f) route constraints on vessels, and (g) initial supply chain system conditions such as vessel locations and starting inventory levels at terminals. Given the data, the Schedule Generator solves a mathematical model to produce a Feasible Schedule (ideally optimal) based on target objectives of delivering full annual volume, minimizing time below inventory lower bound (or stockouts), and minimizing time above inventory upper bound (or lost production). A Feasible Schedule consists of times of loading and discharging material from vessels of transport, inventory levels are all points of the time horizon for all terminals, daily consumption quantity of material at discharge terminals and the difference between planned and actual Million Tonnes/Annum ($\Delta$MTA, or unmet demand) such that all constraints and rules imposed by the Schedule Generator are satisfied. The constraints imposed by the Schedule Generator include travel times between locations, berthing time requirements at terminals, berth limits at terminals, inventory capacities at terminals, maximum capacities of vessels, and any throughput or flow limits and capacities at terminals. The Schedule Generator itself consists of an invention which may be used for operational scheduling of transport vessels. Incorporated into the proposed system, it is a component of a system for LNG supply chain analysis.

A Feasible Schedule is then evaluated based on some metrics of quality which can include whether or not it delivers the planned full annual quantity, acceptable time below inventory lower bound (or stockouts), or acceptable time above inventory upper bound (or lost production). A Schedule Evaluator would consist of solving a mathematical model that steps through a generated Feasible Schedule voyage-by-voyage applying voyage travel time distributions and modifying the schedule as necessary to meet the quality metrics. The goal of the Schedule Evaluator is to minimize deviations from the Feasible Schedule subject to the same constraints as the Schedule Generator given the voyage travel time distribution data to determine the quality of a given Feasible Schedule. The evaluated schedule is then saved and stored. Then the Schedule Generator may be used again in an iterative fashion by adjusting the given data based on the analysis of the Schedule Evaluator as to how to adjust the supply chain for better performance.

Figure 10:
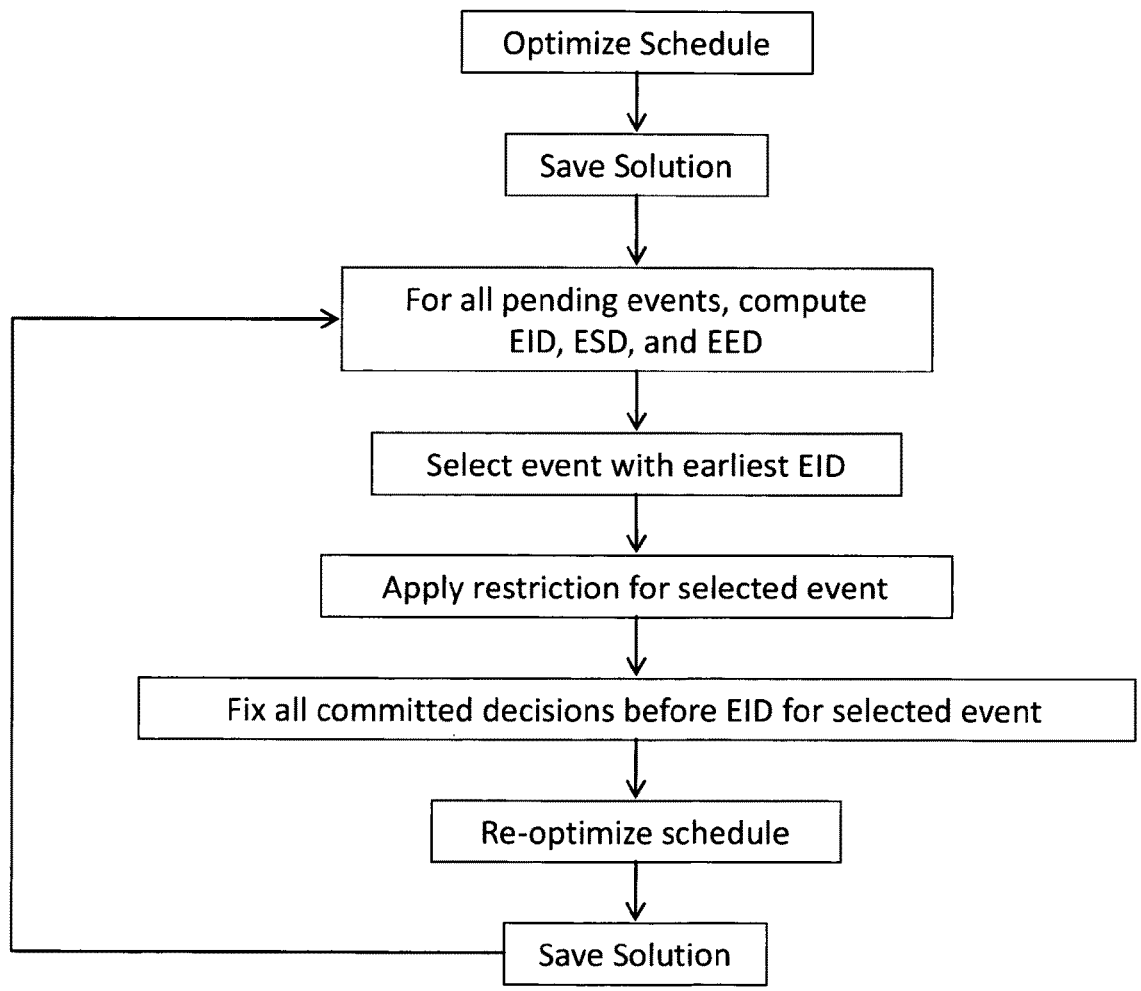
FIG. 10 shows the Schedule Evaluation algorithm for evaluating the robustness of a ship schedule in the presence of unplanned events.

FIG. 10 shows the Schedule Evaluation algorithm for evaluating the robustness of a ship schedule in the presence of unplanned events. At the beginning of the algorithm, the three step heuristic and inventory management problems are solved to generate an optimized ship schedule without accounting for unplanned events. Based on the current schedule, the Event Start Date (ESD), the Event End Date (EED) and the Event Identification Date (EID) for each pending event are evaluated. ESD and EED represent the dates when the event is expected to start and end, respectively, based on the current schedule. EID represents the date when that event is expected to be identified based on the current schedule. The event with the earliest EID is selected and restrictions related to that event are applied. For example, departures from the affected terminal are disabled for the duration of the event if a berth event has been selected. All decisions that have to be implemented before the EID for the selected event are fixed. These include all regas rates and ship departures for days earlier than the EID for the selected event. In addition, initial terminal inventories and initial arrival dates and initial arrival locations for all ships are also fixed. The ship schedule is the re-optimized beyond the EID for the latest event. This process is iterated until no events can be identified.

The interface for providing data to the Schedule Generator (and Schedule Evaluator) may be via manual entry, spreadsheet application, or database. Given the input data, the Schedule Generator's (and Schedule Evaluator's) mathematical model can be developed in a mathematical programming software application such as AIMMS, GAMS, or AMPL, or it can be developed in a computer programming language such as C++ or Java. The mathematical model in the current best mode is a mixed integer linear programming model. The mathematical model given a particular instance of input data can be solved with a solver. A solver consists of either a commercial, freely available, or custom developed algorithm for generating solutions to mathematical models. A solver for the mathematical model may be a hybrid of multiple solvers. Examples of commercial solvers for mixed integer linear programming (MILP) models include CPLEX and XpressMP. An example of a freely available open source solver for MILP models is CBC. In the Technical Report we provide an example of a hybrid solver developed as part of our current best mode of practice.

DEFINITIONS

Mathematical programming software: A computer software system that allows for the modeling of a mathematical programming problem in a symbolic form. This system also provides solvers or connections to solvers for solving mathematical programming problems. Many of these systems also provide their own scripting or programming language to provide the ability to implement problem specific algorithms.

AIMMS: A commercial mathematical programming software application offered by Paragon Decision Technology.

AMPL: A commercial mathematical programming software application offered by AMPL LLC.

GAMS: A commercial mathematical programming software application offered by GAMS Corp.

Solvers: These are implemented algorithms in executable form for solving some general class of optimization or feasibility problem.

CBC: An open source solver under the Common Public License 1.0 for solving Mixed Integer Linear Programming (MILP) problems.

CPLEX: A commercial solver offered by ILOG for solving several classes of optimization problems including Linear Programming (LP), Mixed Integer Linear Programming (MILP), Mixed Integer Quadratic Programming (MIQCP), and Mixed Integer Quadratically Constrained Programming (MIQCP).

XpressMP: A commercial solver offered by Dash Optimization for solving several classes of optimization problems including Linear Programming (LP), Mixed Integer Linear Programming (MILP), Mixed Integer Quadratic Programming (MIQCP), and Mixed Integer Quadratically Constrained Programming (MIQCP).

Time Horizon: The length of time chosen for the scheduling of the ships and management of inventory.

Vessel: A vehicle used for transporting cargo.

Ship cargo capacity: Amount of bulk cargo a ship will load or discharge at a given location.

Location: A place such as a port, depot or terminal at which a vessel loads or discharges cargo.

Route: A path of travel between two particular locations.

Transit time: The time it takes for a vessel to travel between two given locations along the route between them.

Boil-off rate: Rate at which a liquefied product is lost due to evaporation during transit.

MTA: Million Tons per Annum.

Seasonality: The pattern in which production or demand for product changes on a seasonal basis.

Berths: Station at which a vessel occupies while visiting a location.

Regas rate: Rate at which liquefied product is returned to it gaseous state.

Lost Production: Amount of product lost due to inability to load onto a vessel prior to reaching maximum inventory capacity at a production location. Sometimes referred to as overage.

Stockout: Amount of potential demand that is not met due to inability to received delivery from a vessel prior to reaching the minimum inventory capacity at a product consumption location.

Tank top: Refers to an event in which the inventory in a tank reaches the maximum capacity for the tank.

Tank bottom: Refers to an event in which the inventory in a tank reaches the minimum capacity for the tank.

Δ MTA: The difference between amount determined to be delivered in the schedule and the planned amount. Sometimes referred to as unmet demand. Given in units of million tons per annum.

The following is a listing of various component information (data parameters, decision variables, constraints and targets) included in the invention.

Shipping Input Data
   Time Horizon
   Number of vessels
   Ship cargo capacity
   Initial Condition: Ship locations
   Destination restrictions/allowed routes
   Periodic (monthly, annual) transit times for legs
   Boil-off rate (optional)

Production Terminal Input Data
   Stream day rate
   MTA+/−Tolerances
   Maintenance timing
   Breakdown frequency and duration
   Production seasonality (optional)
   Working storage volume
   Number of berths
   Loading rate
   Port time
   Initial condition: Inventory Regas Terminal Input Data
   Max rate
   Average rate
   Min rate
   MTA+/−Tolerances
   Maintenance timing
   Breakdown frequency and duration
   Regas seasonality (optional)
   Working storage volume
   Number of berths
   Loading rate
   Port time
   Initial condition: Inventory Unplanned Events Data
   Unplanned berth events
   Unplanned ship delay events
   Unplanned tropical storm/canal events.
   Trigger event arrival dates
   Duration of events
   Advance warning time for events
   Remaining travel time from destination of trigger voyage when an event starts.
   Regions affected by tropical storm/canal events.
   Travel time from region affected by tropical storm/canal events to regas terminal the ship route.
   Travel time from region affected by tropical storm/canal events to LNG terminal the ship route.
   Origin terminals for trigger voyage of unplanned events
   Destination terminals for trigger voyage of unplanned events.

Constraints/Rules
   Inventory limits
   Travel timing
   Berth availability
   All Bounds Output/Variables
   Load Times
   Discharge Times
   Inventory Levels
   Daily Regas Consumption
   Lost Production
   Stockouts
   Δ MTA Objectives
  Minimize lost production, stockouts, and Δ MTA
Solution Generation
  Develop schedule within constraints optimizing objective function
Outputs
  Feasible schedule
  Inventory profiles
  Number of inventory events and durations FIG. 1 shows a schematic diagram of an example of the present invention. The Schedule Generator takes the input data and generates a shipping schedule meeting various constraints as defined in the Appendix 1 with the goal of optimizing based upon a defined objective function. The Schedule Generator of FIG. 1 is illustrated in more detail in FIG. 3. The output of the Schedule Generator is a Feasible Schedule. A Feasible Schedule consists of detailed information regarding the movements of the ships including such information as load times and discharge times at various locations. As a result of the load and discharge information for the ships, the inventory levels, daily consumption of product and deviation in planned MTA delivered can be directly calculated. The Schedule Evaluator step involves the analysis of the Feasible Schedule to determine flexibility, robustness or other metric value of a schedule when considering unplanned events or disruptions that may deviate from the given input data to the Schedule Generator. The Schedule Evaluator applies deviations in the input data to the Feasible Schedule and seeks to modify it in order to meet the previous objectives in addition to minimizing deviation from the given Feasible Schedule. The modified schedule output from the Schedule Evaluator is then stored via some form of Case Management System. The stored schedule is available for retrieval at a later time. At this point, the process can be iterated again by inputting a new scenario of input data to the Schedule Generator to analyze another supply chain design case.

Figure 2:
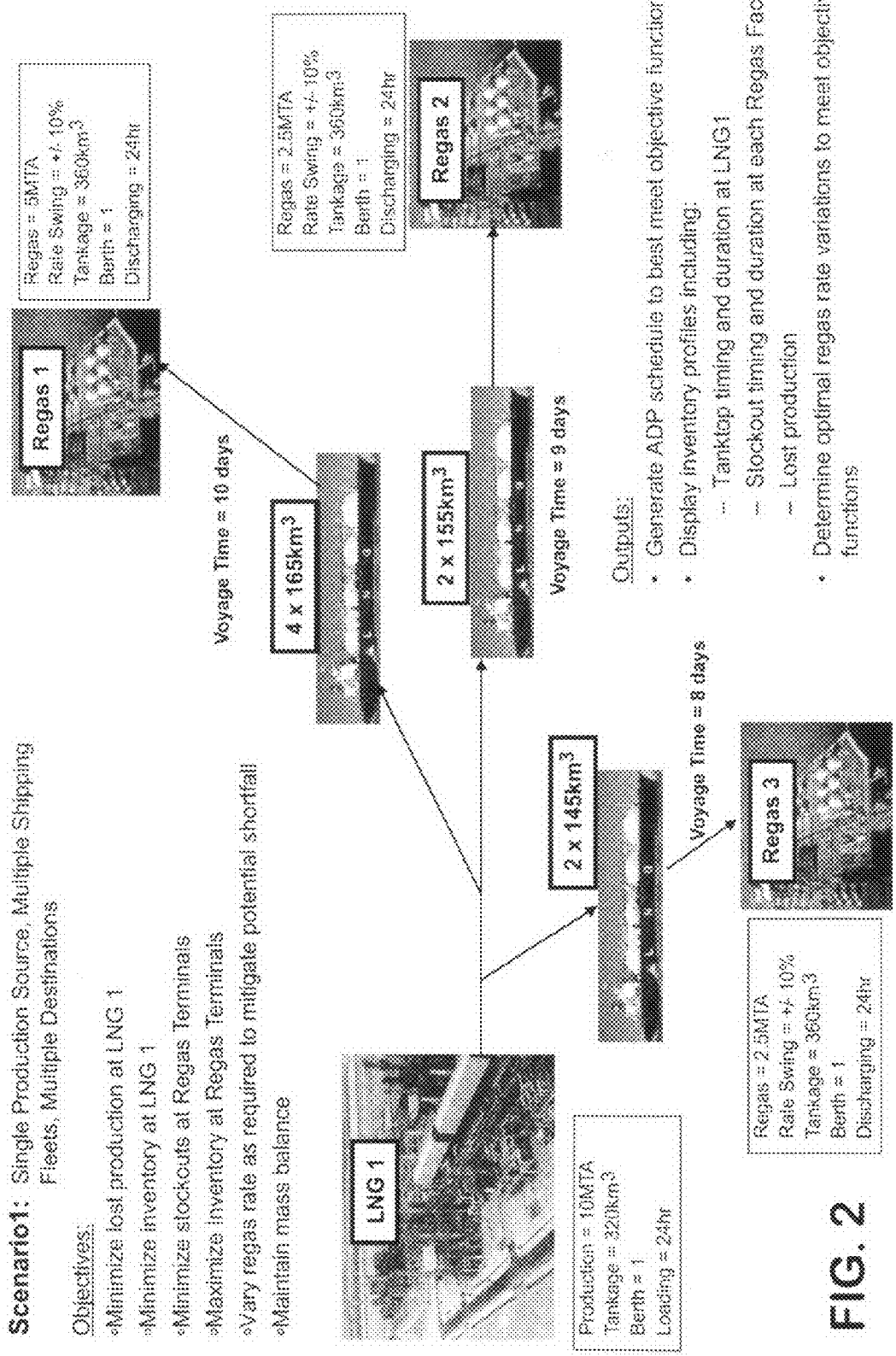
FIG. 2 shows a schematic drawing of a representative example of the present invention.

FIG. 2 illustrates an example supply chain design scenario. This is an example of the kind of scenario that would be used as the basis for the input data provided to the Schedule Generator of FIG. 1. In this particular example there are 8 LNG ships, 1 LNG train producing LNG, and 3 regas terminals consuming LNG.

Figure 3:
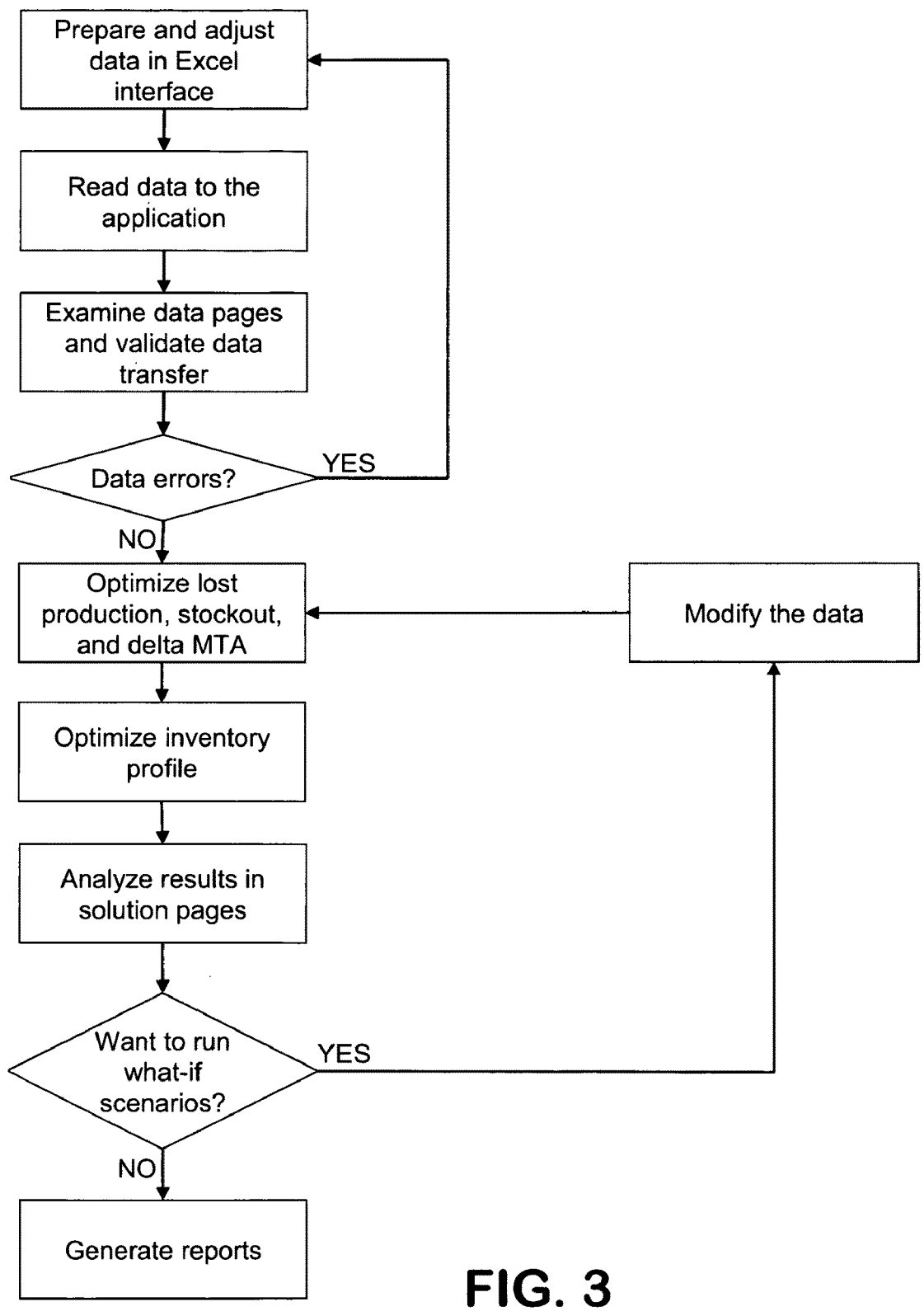
FIG. 3 shows a flow chart of the decisions made in the Schedule Generator component of the present invention.

FIG. 3 is a detailed flowsheet illustrating the current best mode of practice for the Schedule Generator of FIG. 1. An Excel interface is used to prepare and adjust data for input into an optimization application. The data is read into the application from the Excel data interface. The data is checked for error and validated as the next step. If there is an error in the data, it requires modification and adjustment and one is returned to the first step. If not, the primary optimization step is taken to use computational techniques to optimize the objective function subject to constraints to produce schedule information. The detailed mathematics of the optimization step are found in the Appendix. As a secondary optimization step, the inventory profile is optimized given the objective function value obtained in the primary optimization step. The results are then analyzed. At this point additional scenarios may be considered by modifying the data and restarting from the primary optimization step. Otherwise reports are generated and the Feasible Schedule is output.

Figure 4:
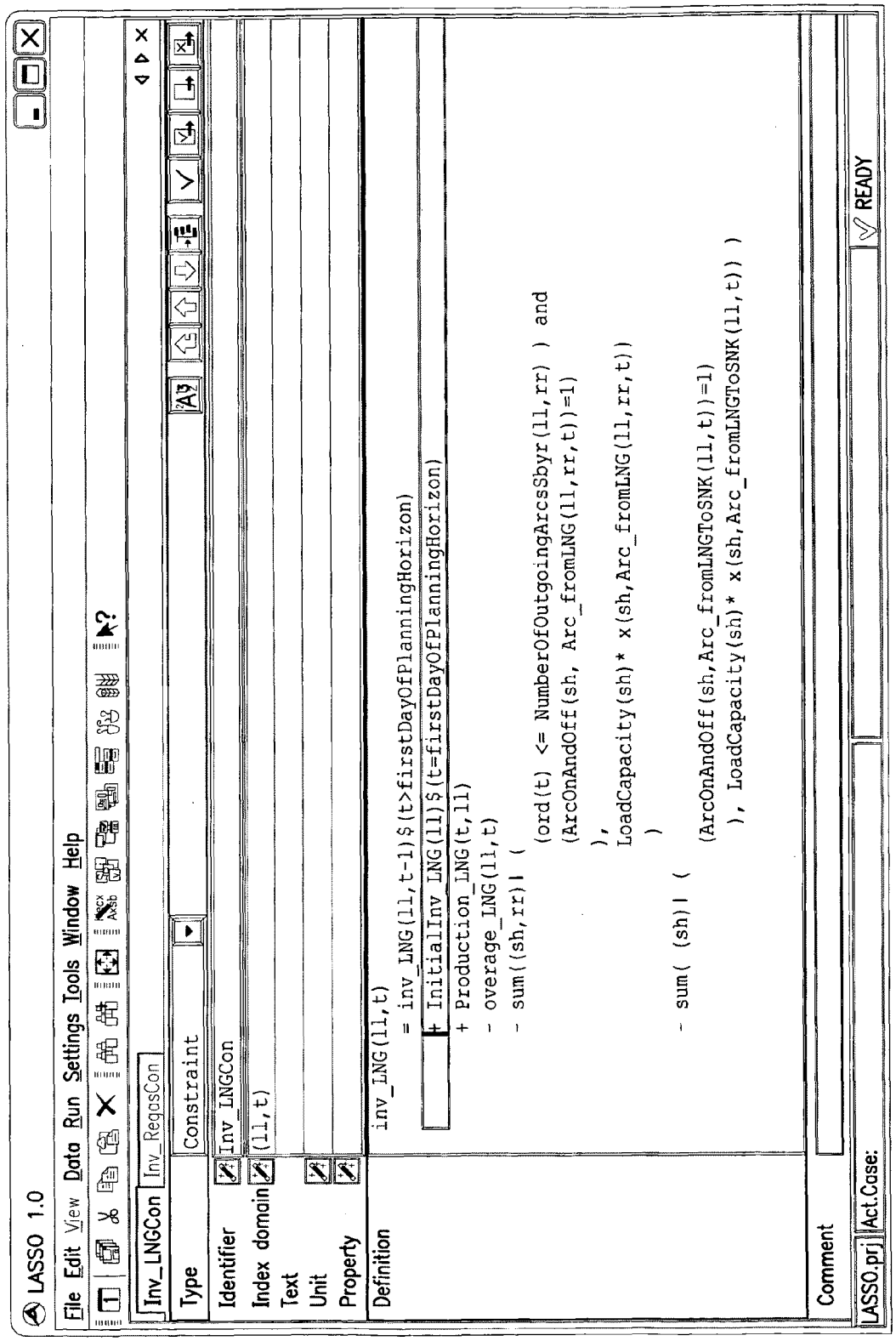
FIG. 4 shows AIMMS Implementation of LNG terminal inventory update constraints.

FIG. 4 is an example of an implementation of the mathematical equations of the Appendix within a mathematical programming language. Equation (5) of the appendix is implemented in the AIMMS software system in FIG. 4. This equation represents an inventory balance at LNG trains.

FIG. 5 is an example of an implementation of the mathematical equations of the Appendix within a mathematical programming language. Equation (6) of the appendix is implemented in the AIMMS software system in FIG. 5. This equation represents an inventory balance at regal terminals.

Figure 6:
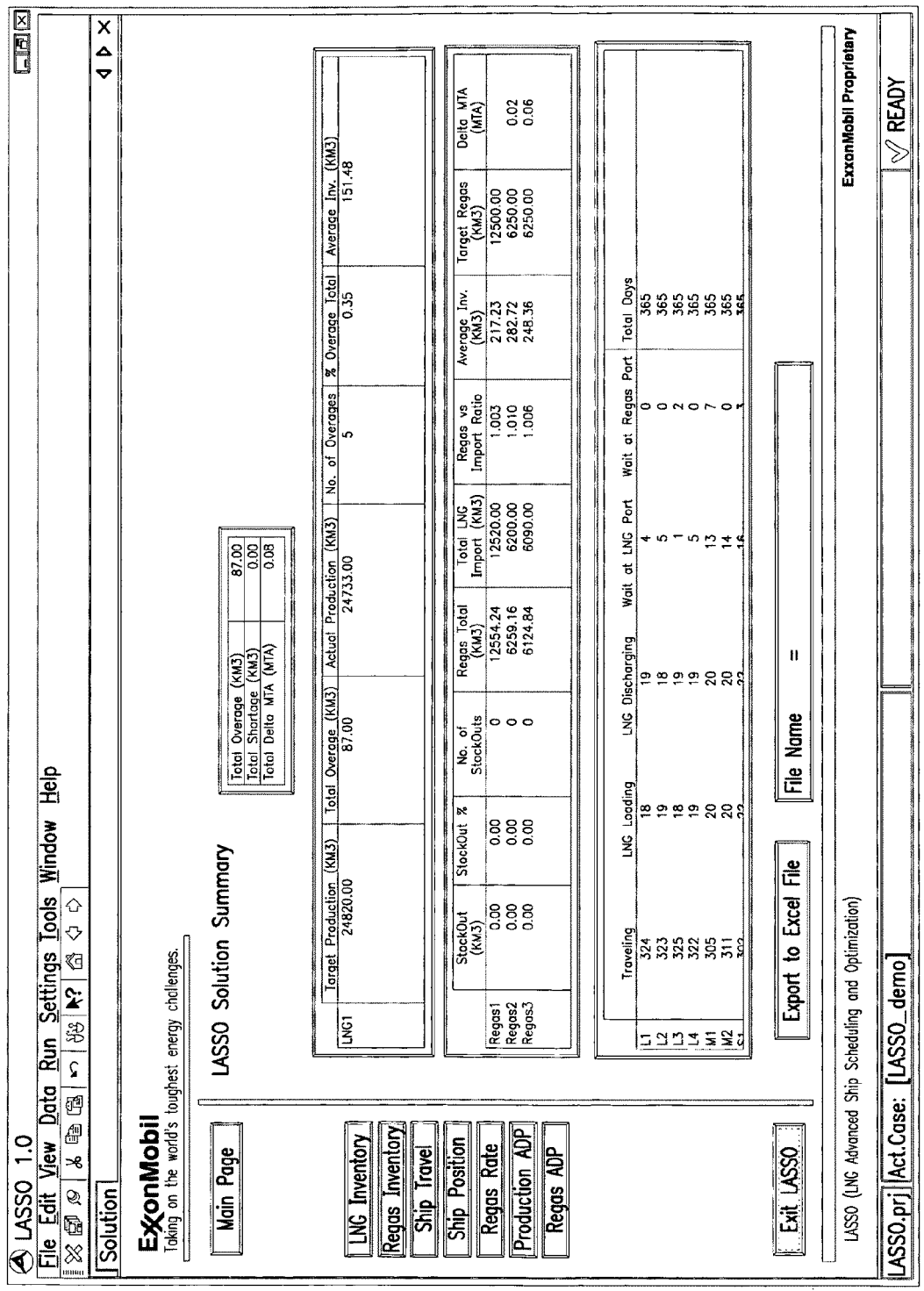
FIG. 6 shows an example of Solution Summary graphical user interface (GUI) page from LASSO application.

FIG. 6 illustrates an example of a summary of results generated by the Schedule Generator. This figure illustrates results based on the LNG supply chain scenario illustrated in FIG. 2 after the primary and secondary optimization steps of the Schedule Generator example of FIG. 3. Overage refers to lost production at the LNG train. Stockout occurs at the regas terminals. Results are provided including lost production metrics, stockout metrics, and the number of days each ship is traveling, loading, discharging, and waiting (idle) at LNG train ports and regas terminal ports.

Figure 7:
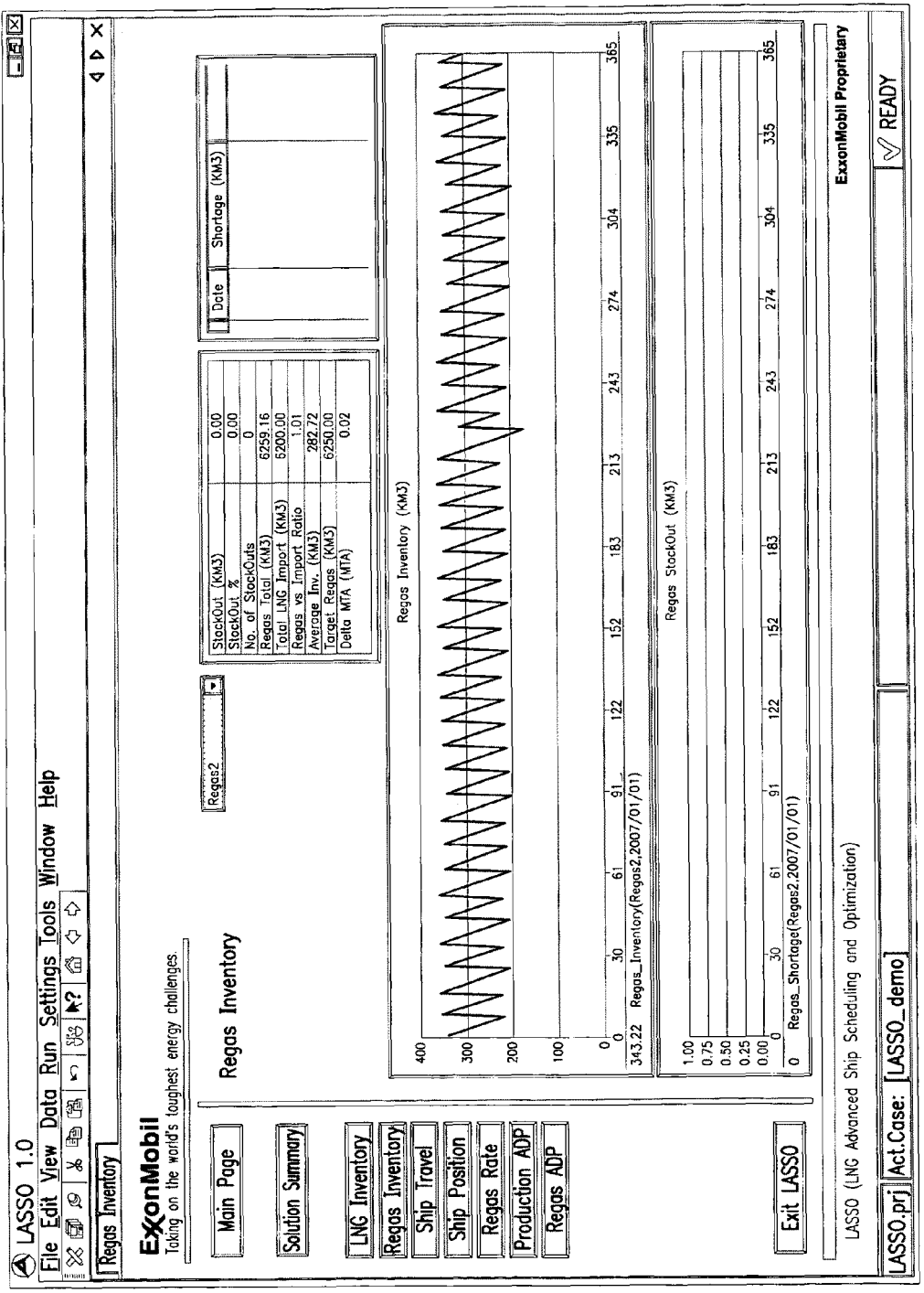
FIG. 7 shows an example GUI page of Regas Terminal Inventory Profile scheduled by LASSO application.

FIG. 7 illustrates an example of regas terminal inventory profile results generated by the Schedule Generator. This figure illustrates results based on the LNG supply chain scenario illustrated in FIG. 2 after the primary and secondary optimization steps of the Schedule Generator example of FIG. 3. It shows the daily inventory level and the daily stockout amount for every day of the planning period.

Figure 8:
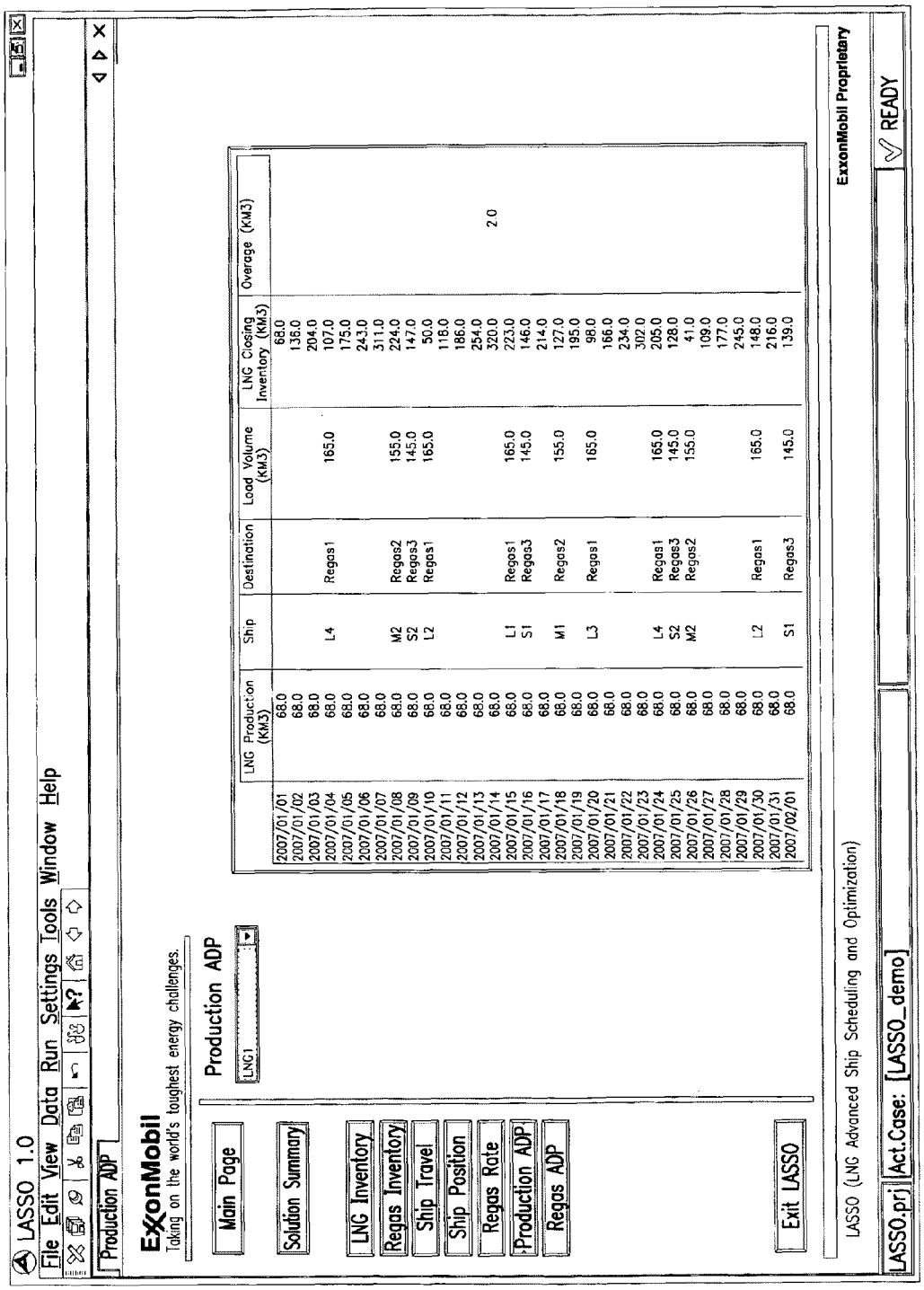
FIG. 8 shows an example GUI page of Production Annual Delivery Plan generated by LASSO application.

FIG. 8 illustrates an example of the LNG production Annual Delivery Plan (ADP) results generated by the Schedule Generator. This figure illustrates results based on the LNG supply chain scenario illustrated in FIG. 2 after the primary and secondary optimization steps of the Schedule Generator example of FIG. 3. It shows the ship arrival dates, ship destinations, load volumes, inventory levels and lost production tracked on a daily basis for an LNG train.

Figure 9:
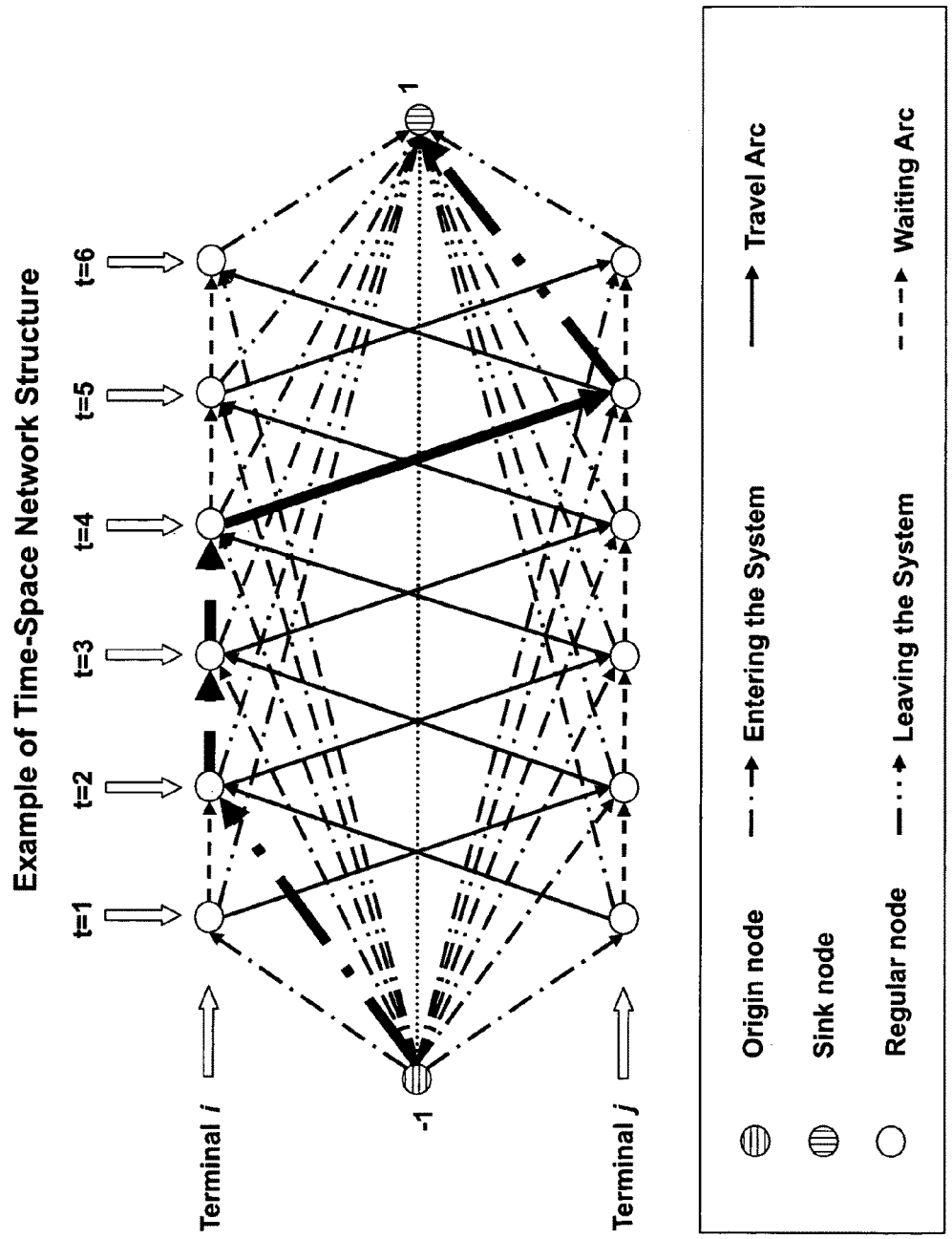
FIG. 9 shows an example of time-space network structure for discussion in Appendix.

FIG. 9 illustrates the time-space expanded network flow model used in the mathematical formulation described in the Appendix 1. This is an illustration of the kinds of arcs included in the model equations described in Equations (2) through (9) of the Appendix. Further discussion concerning this FIG. 9 appears in Appendix Section 2.1.2.

APPENDIX 1

Models and Algorithms for LNG Advanced Ship Scheduling and Optimization

1. Background

LNG Advanced Ship Scheduling and Optimization, or for short LASSO, is a decision support system built for LNG Ships & Marine Systems 16 to help engineers make better decisions on the design of LNG supply chains. In this technical report, we present optimization models and algorithms developed to generate optimal ship schedules. These models and algorithms are the key components of LASSO development.

2. Mixed Integer Programming Formulation
2.1. Notation
2.1.1. Sets and Parameters
  L: LNG terminals. l=1, 2, ..., |L|.
  R: Regas terminals. r=1, 2, ..., |R|.
  V: Vessels (Ships). v=1, 2, ..., |V|.
  $L_v$: Set of LNG terminals allowed for ship v to visit.
  $R_v$: Set of regas terminals allowed for ship v to visit.
  T: Planning horizon. t=1, 2, ..., T
  $C_l$: Storage capacity of LNG terminal l.
  $C_r$: Storage capacity of regas terminal r.
  $C_v^L$: Fixed loading amount for ship v. If necessary, it can be a leg specific amount.
  $C_v^R$: Fixed discharge amount for ship v. If necessary, it can be a leg specific amount.
  $MTA_r$: MTA of regas terminal r.
  $B_l$: Number of berths at LNG terminal l.
  $B_r$: Number of berths at regas terminal r.

$P_{lt}$: Production schedule for LNG terminal l from time t−1 to time t.

$I_{l0}$: Initial inventory of LNG terminal l.

$I_{r0}$: Initial inventory of regas terminal r.

$\underline{D}_r$: Minimum regas rate of regas terminal r.

$\overline{D}_r$: Maximum regas rate of regas terminal r.

$T_{lr}^t$: travel time from LNG terminal l to regas terminal r starting at time t. (including port time)

$T_{rl}^t$: travel time from regas terminal r to LNG terminal l starting at time t. (including port time)

$W_l$: Weight for overage at LNG terminal l.

$W_r$: Weight for shortage at regas terminal r.

$W_r^{MTA}$: Weight for deltaMTA at regas terminal r.

Note that, by setting the above weights appropriately, we can easily accommodate project specific objective functions into the optimization model.

2.1.2. Network

This section contains notations for the network representation (also see FIG. 8). There are many ways to simplify this network structure. For example, we use $L_v$ and $R_v$ in order to reduce the network size, however we don't present them all here. It is important to mention that network simplification can play a key role in solving the problem with the model presented here. Network simplification is a part of preprocessing steps. Another important characteristic of this formulation is that it is easy to accommodate various practical requirements. Most of them can be handled by adding, removing, and/or fixing nodes and arcs. Various planned maintenance activities are an example.

N: Set of nodes. n=(l,t) or n=(r,t) or n=SRC or n=SNK, ∀n∈N.

$\overline{N}$: Set of regular nodes. $\overline{N}$=N\{SRC,SNK}.

$A_v$: Set of arcs for ship v.

A: Set of arcs. A=∪$_v A_v$ $A_v^T$: Set of travel arcs for ship v.

$A_v^{SNK}$: Set of incoming arcs to node SNK for ship v.

$\delta^+(n)$: Set of outgoing arcs from node n.

$\delta^-(n)$: Set of incoming arcs to node n.

As illustrated in FIG. 9, for each ship v, there are four types of arcs; from SRC to a regular node((v,SRC,(l,t)) or (v,SRC,(r,t))), from regular node to SNK((v,(l,t),SNK) or (v,(r,t),SNK)), waiting arcs((v,(l,t),(l,t+1)) or (v,(r,t)(r,t+1))), and travel arcs((v,(l,t),(r,t+$T_{lr}^t$)) or (v,(r,t),(l,t+$T_{rl}^t$))). We can control each ship's initial condition by fixing (or removing) some arcs in the first category. If we use time dependent travel times $T_{lr}^T$ and $T_{rl}^t$, without loss of generality, we assume that the travel times satisfy the following conditions. The first condition implies that the arrival time at terminal r when a ship depart terminal l at time t is less than or equal to the arrival time at terminal r when a ship depart terminal l at time t+1. The second condition implies that it is also true for the other direction.

$t+T_{lr}^t \leq t+1+T_{lr}^{t+1}$, ∀t∈{1,2,…,T}, ∀l∈L, ∀r∈R, $t+T_{rl}^t \leq t+1+T_{rl}^{t+1}$, ∀t∈{1,2,…,T}, ∀l∈L, ∀r∈R.

2.1.3. Decision Variables $I_{lt}$: Inventory level of LNG terminal l at the end of time period t.

$I_{rt}$: Inventory level of regas terminal r at the end of time period t.

$r_{rt}$: Regas rate during time period t.

$o_{lt}$: Lost production (overage) at LNG terminal l during the time period t.

$s_{rt}$: Stockout at regas terminal r during the time period t.

$\delta_r^{MTA}$: max{0,MTA$_r$—Total discharge at regas terminal r}. i.e. Total unmet MTA demand at regas terminal r.

$x_a$: Binary variable for arc a.

2.2. Formulation $$\min \sum_{l,t} W_l o_{lt} + \sum_{r,t} W_r s_{rt} + \sum_r W_r^{MTA} \delta_r^{MTA} \quad (1)$$

$$\text{s.t.} \sum_{a \in A_v \cap \delta^+(n)} x_a - \sum_{a \in A_v \cap \delta^-(n)} x_a = 0, \quad (2)$$

∀v∈V, ∀n∈$\overline{N}$, $$\sum_{a \in A_v \cap \delta^+(SRC)} x_a = 1, \quad (3)$$

∀v∈V, $$\sum_{a \in A_v \cap \delta^-(SNK)} x_a = 1, \quad (4)$$

∀v∈V, $$I_{lt} = I_{lt-1} + P_{lt} - \sum_v \sum_{a \in (A_v^T \cup A_v^{SNK}) \cap \delta^+(l,t)} C_v^L x_a - o_{lt}, \quad (5)$$

∀l∈L, ∀t∈{1, 2, …, T}, $$I_{rt} = I_{rt-1} - r_{rt} + \sum_v \sum_{a \in (A_v^T \cup A_v^{SNK}) \cap \delta^+(r,t)} C_v^R x_a + s_{rt}, \quad (6)$$

∀r∈R, ∀t∈{1, 2, …, T}, $$\sum_v \sum_{a \in (A_v^T \cup A_v^{SNK}) \cap \delta^+(n)} x_a \leq B_l, \quad (7)$$

∀n=(l,t)∈$\overline{N}$, ∀l∈L, $$\sum_v \sum_{a \in (A_v^T \cup A_v^{SNK}) \cap \delta^+(n)} x_a \leq B_r, \quad (8)$$

∀n=(r,t)∈$\overline{N}$, ∀r∈R, $$\delta_r^{MTA} \geq MTA_r - \sum_t \sum_v \sum_{a \in (A_v^T \cup A_v^{SNK}) \cap \delta^+(r,t)} C_v^2 x_a, \quad (9)$$

∀r∈R, $$\underline{D}_r \leq r_{rt} \leq \overline{D}_r, \quad (10)$$

∀r∈R, ∀t∈{1, 2, …, |T|}, $$0 \leq I_{lt} \leq C_l, \quad (11)$$

∀l∈L, ∀t∈{1, 2, …, |T|}, $$0 \leq I_{rt} \leq C_r, \quad (12)$$

∀r∈R, ∀t∈{1, 2, …, |T|}, $$o_{lt} \geq 0, \quad (13)$$

$$s_{rt} \geq 0, \quad (14)$$

$$\delta_r^{MTA} \geq 0, \quad (15)$$

$$x_a \in \{0, 1\} \quad (16)$$

The objective is to minimize the sum of weighted lost production, stockout, and unmet MTA. Constraints (2)-(4) are the flow conservation constraints for the network. Constraints (5) and (6) ensure the inventory balance at LNG terminals and regas terminals, respectively. The berth limits are enforced by constraints (7) and (8). Constraint (9), with the objective function, takes care of the unmet MTA calculation. The final set of constraints (10)-(16) ensures that all the variables satisfy their specific bounds.

Note that we perturb some of the coefficients of the objective function in order to prevent early lost production and early stockout for later use, since we rely on the objective function for the calculations of lost production and stockout. Suppose we have a solution with X amount of lost production at LNG terminal l on day t. In the mathematical model presented above, this solution is the same as the solution with X/2 on day t−1 and X/2 on day t, even though the later one may say that we have lost production without reaching tanktop. We can prevent this phenomenon by setting the weights for lost production and stockout to be time dependent. We use $W_{lt}$ and $W_{rt}$ instead of $W_l$ and $W_r$. For example, with a small value of $\epsilon$, we set $W_{lT}=W_l$, $W_{rT}=W_r$, $W_{lt}=W_{lt+1}+\epsilon$ for all $t \in \{1, 2, \ldots, T-1\}$ and $W_{rt}=W_{rt+1}+\epsilon$ for all $t \in \{1, 2, \ldots, T-1\}$. Then the solution from the above formulation will give us correct lost production and stockout. This means $o_{lt}$ will represent production loss at LNG terminal l during the time period t, and $r_{rt}-s_{rt}$ will represent regas rate at regas terminal r during the time period t.

3. Solution Methods

Due to the complexity of the problem, commercially available Mixed Integer Programming Solvers cannot solve our real world problems in a reasonable amount of time. In this section, we discuss some of solution methods we developed in order to overcome this obstacle.

When homogeneous ships are responsible for the LNG distribution for common LNG and regas terminals, the formulation above has a severe symmetric structure which can causes extremely poor performance of branch-and-cut. In subsection 3.1, we discuss how to break this symmetry.

We develop optimization based heuristic methods in order to solve the model presented. It will give us a capability for finding good solutions in a short amount of time. This method can be used as a stand-alone solution method. It can also be used as a way of warming up exact methods.

3.1. Symmetry Breaking

In many cases, a fleet of homogeneous ships are dedicated to a pair of LNG and regas terminals for the LNG transportation. Let ship $v_1$ and ship $v_2$ be homogeneous and dedicated to LNG terminal $l_1$ and regas terminal $r_1$. Then we can add the following set of constraints based on the initial conditions of ships in order to break the symmetry structure of the feasible region. The followings set of constraints forces a ship to visit a terminal not less than another ship based on their initial conditions in order to break symmetry in the feasible region.

When the earliest possible arrival time at $l_1$ of ship $v_1$ is not later than the earliest possible arrival time at $l_1$ of ship $v_2$.

$$\sum_{t' \leq t} \sum_{a \in (A^T_{v_1} \cup A^{SNK}_{v_1}) \cap \delta^+(l_1,t')} x_a \geq \sum_{t' \leq t} \sum_{a \in (A^T_{v_2} \cup A^{SNK}_{v_2}) \cap \delta^+(l_1,t')} x_a,$$

$\forall t \in \{1, 2, \ldots\}$

When the earliest possible arrival time at $l_1$ of ship $v_1$ is later than the earliest possible arrival time at $l_1$ of ship $v_2$.

$$\sum_{t' \leq t} \sum_{a \in (A^T_{v_1} \cup A^{SNK}_{v_1}) \cap \delta^+(l_1,t')} x_a \leq \sum_{t' \leq t} \sum_{a \in (A^T_{v_2} \cup A^{SNK}_{v_2}) \cap \delta^+(l_1,t')} x_a,$$

$\forall t \in \{1, 2, \ldots, T\}$.

When the earliest possible arrival time at $r_1$ of ship $v_1$ is not later than the earliest possible arrival time at $r_1$ of ship $v_2$.

$$\sum_{t' \leq t} \sum_{a \in (A^T_{v_1} \cup A^{SNK}_{v_1}) \cap \delta^+(r_1,t')} x_a \geq \sum_{t' \leq t} \sum_{a \in (A^T_{v_2} \cup A^{SNK}_{v_2}) \cap \delta^+(r_1,t')} x_a,$$

$\forall t \in \{1, 2, \ldots, T\}$.

When the earliest possible arrival time at $r_1$ of ship $v_1$ is later than the earliest possible arrival time at $r_1$ of ship $v_2$.

$$\sum_{t' \leq t} \sum_{a \in (A^T_{v_1} \cup A^{SNK}_{v_1}) \cap \delta^+(r_1,t')} x_a \leq \sum_{t' \leq t} \sum_{a \in (A^T_{v_2} \cup A^{SNK}_{v_2}) \cap \delta^+(r_1,t')} x_a,$$

$\forall t \in \{1, 2, \ldots\}$

It is easy to see that there exist many feasible solutions which do not satisfy the above constraints. At the same time, it is also easy to see that any feasible solution which does not satisfy the above symmetry breaking constraints can be converted to a feasible solution which satisfies the symmetry breaking constraints with the same objective function value. So the above symmetry breaking constraints eliminate some of the symmetry from the feasible region.

This idea can be extended further. When $L_{v_1}=L_{v_2}$ and $R_{v_1}=R_{v_2}$ for ship $v_1$ and ship $v_2$, the above symmetry breaking constraints can be generalized. Forcing First In First Out (FIFO) rule at each terminal to ship $v_1$ and ship $v_2$ can eliminate more symmetry.

3.2. Optimization Based Heuristic

The proposed model is too large and complicated to solve practical problems. However, a commercial MIP solver still works well with small instances. We use a commercial optimization algorithm in the framework of a large neighborhood search. This large neighborhood search procedure needs to have a feasible solution to start with. It is extremely easy to find a feasible solution in this formulation because doing nothing is also a feasible solution. We can also use other initial feasible solutions. From the initial solution, we set up two-ship problems iteratively until we can't find a better solution from this method. There can be many variations of this method. The algorithm is described in Algorithm 1 in detail.

---

Algorithm 1 Optimization Based Heuristic

---

Find an initial feasible solution.
count = 0
while count < | V | *(| V | −1)/2 do
    Select two ships v and v' which have never been selected since the best solution so far found
    Fix binary variables which are not associated with ship v and v'
    Solve MIP
    if Better solution found then
        count = 0
    else
        count = count + 1
    end if
end while

---

4. Inventory Management

Inventory profile is a good indication of the robustness of a LNG ship schedule. Maintaining low inventories at LNG terminals and high inventories at regas terminals is important because it can provide flexibility to allow the system to return to the plan without disrupting production and regas operation when ships get delayed. A schedule with this kind of inventory profile is referred to as a robust schedule. Let $\hat{z}^*$ be the objective function value from the best solution found through the solution method above. There may exist robust schedules with a value as good as the $\hat{z}^*$ objective function value. We may be willing to give up a little from $\hat{z}^*$ in order to get a more robust schedule. As a post-processing step, we solve the following model in order to find a more robust schedule. The amount of give-up g is a user input data and its default value is 0.

The next constraint is necessary to guarantee that the value of the solution from this post-processing model is at most $\hat{z}^*+g$. If g=0, then the solution from the post-processing is as good as the solution found.

$$\sum_{l,t} W_l o_{lt} + \sum_{r,t} W_r s_{rt} + \sum_r W_r^{MTA} \delta_r^{MTA} \leq \hat{z}^* + g.$$

The following objective function is used in the post-processing model in order to find a robust schedule. The weight w for inventory level is used.

$$\min \sum_{l,t} w I_{lt} - \sum_{r,t} w I_{rt} + \sum_{l,t} W_l o_{lt} + \sum_{r,t} W_r s_{rt} + \sum_r W_r^{MTA} \delta_r^{MTA}$$

In practice, it is not required to find an optimal solution to the post-processing model. A good solution is enough. Algorithm 1 can be used again to solve the post-processing inventory management model. The only difference is that the algorithm takes the best solution found so far as an initial solution. Computational experimentation has shown that the post-processing step is significantly efficient to find a robust schedule.

APPENDIX 2

Robust LNG Ship Scheduling and Inventory Management

1. Background

The present invention analyzes the LNG supply chain (loading facilities, LNG ship, and unloading facilities) and makes recommendations for LNG ships, terminal infrastructure, and operational design. In LNG projects, there is an annual process to schedule LNG liftings and deliveries between sellers and buyers. The LNG Advanced Ship Scheduling and Optimization (LASSO) decision support system has the ability to generate schedules, evaluate and quantify the effect of potential disruptions, and use optimization algorithms to generate the best schedule. The primary functionality provided in Appendix 1 was to generate a feasible ship schedule and develop an LNG Annual Delivery Program (ADP) for a given LNG supply chain. Specifically, the optimization model allows seasonality in regas rates and optimization of initial ship location and terminal inventories. Also, unlike, Appendix 1 the optimization model presented here allows ships to wait at terminals at the end of the planning horizon which reduces end effects in the schedule due to a finite planning horizon. A framework for evaluating the effect of unplanned events on a ship schedule is also presented. Finally, a new three step solution strategy is presented.

2 Mixed Integer Programming Formulation

The notation and optimization model in LASSO are presented below. While the optimization model is structurally very similar to that presented in, 1 some important enhancements have been made.

2.1 Notation 2.1.1 Sets and Parameters

Same as Appendix 1

2.1.2 Network

Similar to Appendix 1, the optimization model is built on a time-space network representation. Note that unlike, 1 the time-space network presented above includes extra demurrage arcs (v; (l; T); SNK) and (v; (r; T); SNK) that allow ships to wait at a terminal at the end of the planning horizon.

2.1.3 Decision Variables

Same as Appendix 1 with the additions of the variables representing the initial inventory at all LNG and regas terminals.

2.2 Formulation $$\min \sum_{l,t} W_l o_{lt} + \sum_{r,t} W_r s_{rt} + \sum_r W_r^{MTA} \delta_r^{MTA}$$

s.t. $\sum_{a \in A_v \cap \delta^+(n)} x_a - \sum_{a \in A_v \cap \delta^-(n)} x_a = 0,$ $\forall v \in V, \forall n \in \overline{N},$ $\sum_{a \in A_v \cap \delta^+(SRC)} x_a = 1,$ $\forall v \in V,$ $\sum_{a \in A_v \cap \delta^-(SNK)} x_a = 1,$ $\forall v \in V,$ $I_{lt} = I_{lt-1} + P_{lt} - \sum_v \sum_{a \in (A_v^T \cup A_v^{SNK}) \cap \delta^+(l,t)} C_v^L x_a - o_{lt},$ $\forall l \in L, \forall t \in \{1, 2, \ldots, T\},$ $I_{rt} = I_{rt-1} - r_{rt} + \sum_v \sum_{a \in (A_v^T \cup A_v^{SNK}) \cap \delta^+(r,t)} C_v^R x_a + s_{rt},$ $\forall r \in R, \forall t \in \{1, 2, \ldots, T\},$ $\sum_v \sum_{a \in (A_v^T \cup A_v^{SNK}) \cap \delta^+(n)} x_a \leq B_l,$ $\forall n = (l, t) \in \overline{N}, \forall l \in L,$ $\sum_v \sum_{a \in (A_v^T \cup A_v^{SNK}) \cap \delta^+(n)} x_a \leq B_r,$ $\forall n = (r, t) \in \overline{N}, \forall r \in R,$ $\delta_r^{MTA} \geq MTA_r - \sum_t \sum_v \sum_{a \in (A_v^T \cup A_v^{SNK}) \cap \delta^+(r,t)} C_v^2 x_a,$ $\forall r \in R,$ $\underline{D}_r \leq r_{rt} \leq \overline{D}_r,$ $\forall r \in R, \forall t \in \{1, 2, \ldots, |T|\},$ $0 \leq I_{lt} \leq C_l,$ $\forall l \in L, \forall t \in \{1, 2, \ldots, |T|\},$ $0 \leq I_{rt} \leq C_r,$ $\forall r \in R, \forall t \in \{1, 2, \ldots, |T|\},$ $\underline{I}_l \leq I_{l0} \leq \overline{I}_l,$ $\forall l \in L,$ -continued $l_r \le l_{r0} \le \bar{l}_r,$ $\forall r \in R,$ $o_{lt} \ge 0,$ $s_{rt} \ge 0,$ $\delta_r^{MTA} \ge 0,$ $x_a \in \{0, 1\}$ Similar to Appendix 1 the objective is to minimize the sum of weighted lost production, stockout, and unmet demand. By setting the penalty weights appropriately, we can easily accommodate project specific objective functions into the optimization model. Constraints (2)-(4) are the flow conservation constraints for the network. Constraints (5) and (6) ensure the inventory balance at LNG terminals and regas terminals, respectively. The berth limits are enforced by constraints (7) and (8). Constraint (9), with the objective function, takes care of the unmet demand calculation. The final set of constraints (10)-(18) ensures that all the variables satisfy their specific bounds. As mentioned by, 1 we perturb some of the coefficients of the objective function in order to prevent early lost production and early stockout for later use, since we rely on the objective function for the calculations of lost production and stockout. While the optimization model presented above is largely similar to the one presented in Appendix 1 it includes the following enhancements 1. Seasonality in maximum and minimum regas rates can be modeled
2. Appendix 1 assumed that initial inventory levels were inputs to the optimization model. However, in the above formulation initial inventory levels (Il0 and Ir0) are considered optimization variables and can be optimized to obtain "'steady state'" values.
3. Appendix 1 assumed that initial arrival time and location for all ships were inputs to the optimization model. On the other hand, the time-space network presented above includes initial arrival arcs for vessel v from SRC to all regular nodes where that vessel can arrive initially. As a result, the optimization model optimizes the initial arrival time and location for each vessel. Alternatively, the initial arrival time and location for vessel v can be fixed by excluding all initial arrival arcs for v from SRC to regular nodes except the arc from SRC to the regular node that corresponds to the initial arrival time and location.
4. As noted above, the time-space network includes extra demurrage arcs (v; (l; T); SNK) and (v; (r; T); SNK) that allow ships to wait at a terminal at the end of the planning horizon. This reduces undesirable end-effects caused due to a finite planning horizon.

3 Solution Methods

Figure 11:
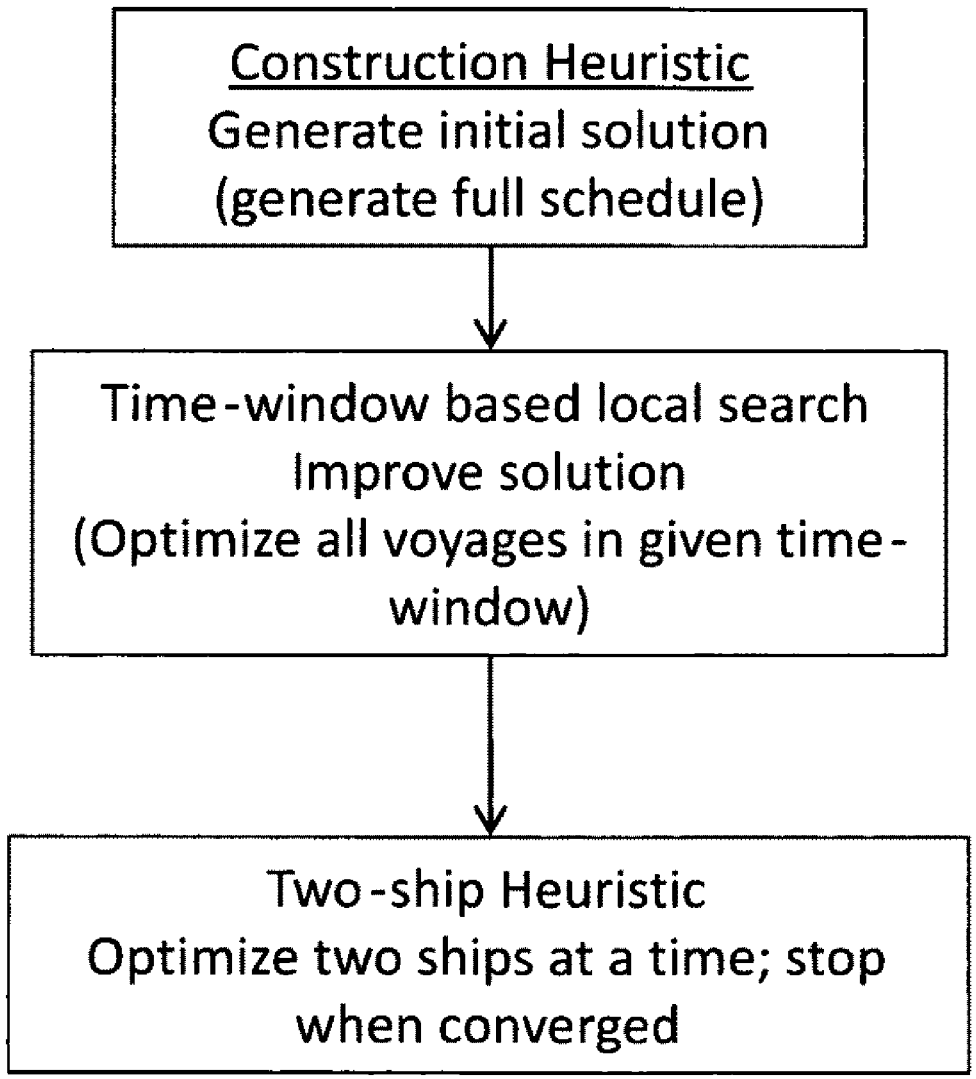
FIG. 11 shows an outline of the three stage heuristic to generate an initial feasible schedule.

Due to the complexity of the problem, commercially available Mixed Integer Programming Solvers cannot solve our real world problems in a reasonable amount of time. In this appendix, we discuss a three step heuristic to solve the model approximately. FIG. 11 shows an outline of the three stage heuristic. In this approach, a construction heuristic is first used to generate a good initial ship schedule. Two different types of neighborhood structures are then used to conduct large neighborhood searches in order to improve the initial solution. A commercially available Mixed Integer Programming solver is used to solve the sub-problems generated during these search steps.

3.1 Construction Heuristic

The Construction Heuristic shown in Algorithm 1 generates a feasible schedule by prioritizing daily liftings/discharges at each terminal based on a pre-defined criteria. The generated schedules fixes the daily regas rate at (Dr;t+Dr;t)/2. In Algorithm 1, the initial ship arrival time/locations and the initial inventories can be determined using algorithm 2. This algorithm tries to ensure that Initial distribution of ship capacity is consistent with ship capacity demands at terminals Ship capacity is available at the earliest possible time Each LNG terminal has enough inventory at the start of the planning horizon such that all ships that will arrive at that terminal from SRC can be loaded on arrival.

Each regas terminal has enough empty volume at the start of the planning horizon such that all ships that will arrive at that terminal from SRC can be unloaded on arrival.

The initial inventory levels are within specified bounds 3.2 Time Window Based Local Search The solution obtained from the construction heuristic is improved using a time window based large neighborhood search. The neighborhood consists of all solutions in which a ship loading/unloading is delayed/advanced by at most m days, compared to the solution obtained from the construction heuristic. The reduced sub-problem obtained by restricting the loading/unloading dates to the neighborhood defined above is solved using a commercial solver. A resource (time or node) limit can be applied to this search to avoid overly large solve times.

3.3 Two Ship Heuristic

The solution obtained from the two-ship heuristic is improved by applying a two-ship heuristic (see Appendix 1). In this search, a neighborhood is defined by allowing the schedules for exactly two selected ships to vary around the current solution. The schedules for all other ships are fixed. The algorithm iteratively selects pairs of ships and solves the corresponding two-ship problem. This process is repeated until a better solution cannot be generated. The procedure is described in Algorithm 3.

3.3.1 Selection of Ship Pairs

The efficiency of the two ship heuristic depends on the sequence of two-ship problems solved during the algorithm. By selecting ship pairs that are most likely to lead to a better solution, the number of optimization solves can be minimized. At each step of the two ship heuristic, we identify the most promising ship pair (v1; v2) for re-optimization using the following approach. Based on the current schedule, (v1) is associated with the ship that maximizes the scope for reduction in lost production and stockouts if the schedule for that ship were re-optimized. More precisely, for each ship we calculate the total lost production and stockouts that could be avoided if the slack (demurrage) in the schedule for that ship were eliminated but the sequence of terminals visited by the ship remained the unchanged. This metric represents the potential reduction in the objective function if the schedule for the corresponding ship were re-optimized. The ship that associated with the largest value for this metric is selected as v1.

Vessel v2 is chosen such that the likelihood of reducing the slack in schedule for v1 when schedules for v1 and v2 are simultaneous re-optimized is maximum. More specifically, for each ship v, a metric that represents the number of times when loading/unloading for v1 at a terminal is de-prioritized in favor of v is calculated. This metric includes cases where v1 demurs at a terminal while v loads/unloads at that terminal.

v1 arrives and demurs at a terminal and v was the last ship to load/unload at that terminal before v1 arrived at that terminal.

The ship associated with the largest value for this metric is selected as v2.

3.4 Inventory Management

Maintaining low inventories at LNG terminals and high inventories at regas terminals provides the system more flexibility in recovering from ship delays and disruptions. Therefore, after obtaining a good schedule from the three step heuristic, an inventory management problem is solved to decrease the inventory levels at LNG terminals and increase the inventory levels at regas terminals such that the lost production, stockouts and unmet demands do not increase relative to the current solution. Algorithm 3 can be used to solve the post-processing inventory management model also.

4 Unplanned Events

The above optimization model and solution algorithms optimize the ship schedule of an LNG ship fleet. In this section, we present an approach for evaluating the robustness of a ship schedule in the face of unplanned events. This enables evaluation of how well the LNG supply chain will be able to recover from various unplanned events. We consider three types of unplanned events.

A Berth Event causes all berths at the affected terminal to be unavailable for loading/unloading for the duration of the event. Berth events lead to delay in departures for all ships that were supposed to load/unload at the affected terminal during the event.

A Ship Delay Event occurs during a voyage between two terminals and causes the arrival time for the affected ship voyage to be delayed. These events are intended to model ship breakdown during voyages.

A Tropical Storm/Canal Event prevents any travel through the affected region for the duration of the event. As a result, all ships traveling through the affected region at the time of the event are delayed.

FIG. 10 shows the Schedule Evaluation algorithm for evaluating the robustness of a ship schedule in the presence of unplanned events. At the beginning of the algorithm, the three-step heuristic and inventory management problems are solved to generate an optimized ship schedule without accounting for unplanned events. Based on the current schedule, the Event Start Date (ESD), the Event End Date (EED) and the Event Identification Date (EID) for each pending event are evaluated.

ESD and EED represent the dates when the event is expected to start and end, respectively, based on the current schedule. EID represents the date when that event is expected to be identified based on the current schedule. The event with the earliest EID is selected and restrictions related to that event are applied. For example, departures from the affected terminal are disabled for the duration of the event if a berth event has been selected. All decisions that have to be implemented before the EID for the selected event are fixed. These include all regas rates and ship departures for days earlier than the EID for the selected event. In addition, initial terminal inventories and initial arrival dates and initial arrival locations for all ships are also fixed. The ship schedule is the re-optimized beyond the EID for the latest event. This process is iterated until no events can be identified.

4.1 Event Calculations

The following notation is used for representing the steps of the Schedule Evaluation algorithm. All data represented by identifiers in the following table is specified as input.

BE: Set of unplanned berth events.
SDE: Set of unplanned ship delay events.
SCUE: Set of unplanned tropical storm/canal events.
UE: Set of all unplanned events.
TAD(ue): Trigger arrival date for unplanned event ue
Duration(ue): Duration of unplanned event ue.
Forecast(ue): Advance warning time for unplanned event ue.
TFD(ue): Remaining travel time from destination for trigger voyage when an unplanned event due to berth or ship event, starts.
REG: Set of all regions affected by tropical storm/canal events.
RTFD(l; r; reg): Travel time from reg to r along route l to r; Definition for
RTFD(r; l; reg) is analogous.
SCUEReg(scue): Region affected by tropical storm/canal event.
TrigSrcTerm(ue): Origin terminal for trigger voyage of unplanned event.
TrigDestTerm(ue): Destination terminal for trigger voyage of unplanned event.

4.1.1 Trigger Voyages

A voyage is defined by a ship, a source terminal, a departure time from the source terminal, a destination terminal, and an arrival time at the destination terminal. As explained above, at each iteration of the Schedule Evaluation algorithm, EID, ESD and EED are evaluated for each pending event based on the current ship schedule. In order to do this, a trigger voyage is first identified for each pending event based on the current schedule. For a berth event, the trigger voyage corresponds to the first voyage that arrives at the trigger destination terminal on or later than the trigger arrival date in the current schedule.

The trigger voyage for a ship delay or a tropical storm/canal event corresponds to the first voyage that arrives at the trigger destination terminal from the trigger source terminal on or later than the trigger arrival date in the current schedule. The ship associated with the trigger voyage for an event is referred to as the trigger ship for that event.

4.1.2 Event Dates

Event ue is expected to start TFD(ue) in advance of the trigger ship's scheduled arrival at its destination terminal for the trigger voyage. Further, event ue is expected to be identified Forecast(ue) days in advance of its start date. In general, the following equations are used to calculate EID, ESD and EED for event e.

$$ESD(ue)=\text{ArrivalDateForTriggerVoyage}(ue)-\text{TFD}(ue)$$

$$EID(ue)=\text{ArrivalDateForTriggerVoyage}(ue)-\text{TFD}(ue)-\text{Forecast}(ue)$$

$$EED(ue)=ESD(ue)+\text{Duration}(ue)-1$$

4.2 Delays And Restrictions

As mentioned above, no loading/unloading can take place at the affected terminal during a berth event. As a result, loading/unloading activities for all ships that were scheduled to load/unload at a terminal affected by a berth event during the duration of that event will be rescheduled when the ship schedule and inventory management models are re-optimized in response to the berth event. In general, berth events may affect multiple ships. On the other hand, a ship delay event has a direct effect only on the trigger voyage. When a ship delay event is identified, the travel time for the trigger voyage is increased by the length of duration of the event. This cause the arrival of this voyage at the destination terminal to be delayed. Obviously, schedules for other voyages may change when the ship schedule and inventory improvement models are re-optimized in response to this event. Tropical storm/canal events can affect multiple voyages and the duration of delay depends on the schedule for the voyages. When a tropical storm/canal event is identified, dates of arrival in the affected region are calculated for all possible voyages that travel through the affected region. Delays are applied by increasing travel times for all voyages that will arrive in the affected region during the tropical storm/canal event. Mathematically, ArrivalTimeOfVoyageInAffectedRegion=ScheduledArrivalTimeOfVoyageAtDestinationTerminal($v;l;r$)−RTFD DelayDueToTropicalStormOrCanalEvent=EED−ArrivalTimeOfVoyageInAffectedRegion+1

Note that the above calculations are done for all possible voyages, as opposed to only those voyages that are active in the current schedule. As a result, voyages that are not active in the current schedule but that become active when ship schedules and inventory management problems are re-optimized will also be affected by the tropical storm/canal event if they arrive in the affected region during that event.

---

Algorithm 1 Construction Heuristic

---

Initialize ship locations and terminal inventory levels
for t = 1, 2, ... ..., T do
    for all tr do
        Evaluate inventory level at end of t assuming no ship liftings/discharges at tr at t
        Identify ships that can be loaded/unloaded at tr at t based on ship location, ship capacity and terminal inventory
        while another berth is available to load/unload a ship do
            Identify terminals TR' that can receive at least one of the above ships
            for all tr' in TR' do
                NetShipCapacityDemand(tr') = [TotalProductionVolume(tr') (or TotalRegasVolume(tr')) − Ship-CapacityAvailable(tr')] in next n days
            end for
            Select terminal tr* = argmax NetShipCapacityDemand(tr'), where max is taken over all tr' in TR'
            Select largest ship that can be loaded/unloaded at tr at t and that can be sent to tr*
        end while
        Update inventory level, stockout/lost production at tr at end of t
    end for
end for

---

Algorithm 2 Initialization

---

Disallow all inter-terminal voyages. Optimize schedule.
For each ship, assign initial arrival location based on above solution.
Assign each ship to arrive at its initial destination on the earliest date possible.
for all l do
    $I_{10}$ = max($I_1$; min($I_1$;NSCS(1)))
    where,
    NSCS(1) = Net Ship Capacity Supply at 1 = Total load capacity of ships assigned to arrive at 1 from SRC
    − Cumulative production volume at 1 until last ship arrives at 1 from SRC
end for
for all r do
    Ir' = Cr − min(Cr − Ir; max(Cr − Ir;NSCS(r)))
    where,
    NSCS(r) = Net Ship Capacity Supply at r = Total discharge capacity of ships assigned to arrive at r from SRC − Cumulative regas volume at r until last ship arrives at r from SRC
end for Algorithm 3 Two Ship Heuristic

```
Find an initial feasible solution.
count = 0
while count <| V | *(| V | −1)/2 do
    Select two ships v and v' which have never been selected since the
    best solution so far found
    Fix binary variables which are not associated with ship v and v'
    Solve MIP
    if Better solution found then
        count = 0
    else
        count = count + 1
    end if
end while
```

| Mathematical Symbol | Description |
|---|---|
| $\in$ | Is an element of |
| $\notin$ | Is not an element of |
| \ | Refers to subtraction from a set |
| $\cup$ | Refers to the union of sets |
| $\cap$ | Refers to the intersection of sets |
| $\Sigma$ | Summation |
| $\forall$ | For all |
| = | Equal to |
| $\neq$ | Not equal to |
| $\leq$ | Less than or equal to |
| $\geq$ | Greater than or equal to |

What is claimed is:

1. A computer-implemented method to plan and schedule bulk material distribution for the transportation of bulk materials from supply terminals to demand terminals, comprising:
   providing a computational system;
   executing, using the computational system, a plurality of computer-executable instructions, the executed instructions providing a method comprising:
   a) obtaining input data specifying a plurality of requirements to be satisfied for a marine transportation schedule of a plurality of ships to meet predetermined objectives represented by an objective function,
   b) determining a current feasible schedule from said input data, the current feasible schedule comprising a ship schedule for each of the plurality of ships,
   c) evaluating said current feasible schedule to determine a current objective function value based on the predetermined objectives,
   d) iteratively generating alternative feasible schedules, the iterative generation method comprising:
      selecting a first ship and a second ship from the plurality of ships, the first ship having a first ship schedule in the current feasible schedule and the second ship having a second ship schedule in the current feasible schedule;
      modifying the first ship schedule and the second ship schedule to generate an alternative feasible schedule;
      evaluating the alternative feasible schedule to determine an alternative objective function value based on the predetermined objectives; and
      selecting the current feasible schedule or the alternative feasible schedule to become the current feasible schedule based on the current objective function value and the alternative objective function value, and
   e) generating, after said iterative generating of the alternative feasible schedules, an operational plan for ship scheduling based on the current feasible schedule,
   wherein the objective function comprises at least a first constraint for generation of bulk material at a supply terminal, a second constraint for a maximum amount of bulk material at a supply terminal, a third constraint for reduction of bulk material at a demand terminal, and a fourth constraint for a minimum amount of bulk material at a demand terminal.

2. The method of claim 1 wherein said input data includes shipping input data, production terminal input data, demand terminal input data, constraints, rules, variables, and objectives.

3. The method of claim 1 wherein said input data includes one or more of time horizon, assumed travel times, throughputs and tolerance, inventory limits, vessel information, and initial system conditions.

4. The method of claim 3 wherein said vessel information includes capacity, speed, number, and route constraints.

5. The method of claim 3 wherein said initial system conditions include vessel locations and inventory levels.

6. The method of claim 3 wherein said input data further includes objectives.

7. The method of claim 6 wherein said objectives include one or more of deliver full annual volume, minimize time below inventory lower bound, and minimize time above inventory upper bound.

8. The method of claim 7 wherein said objectives further include minimize deviations from the current and the alternative feasible schedules.

9. The method according to claim 1 involving more than one ship, wherein:
   i) the step of determining the current and the alternative feasible schedules comprises generating a minimum set of travel choices by eliminating infeasible choices from the time-space network, and
   ii) the step of evaluating the current and the alternative feasible schedules includes assigning an initial voyage to each ship among terminals.

10. The computer-implemented method of claim 1, wherein selecting a pair of ships comprises:
    selecting a first ship based on amount of slack in a schedule for the first ship using a sequence of terminals in the current feasible schedule; and
    selecting a second ship based on an amount of demurrage time for the second ship at a terminal, wherein the first ship is present at the terminal during the demurrage time.

11. The computer-implemented method of claim 1, further comprising:
    after iteratively generating the alternative feasible schedules and prior to generating the operational plan for ship scheduling, applying an unplanned event to the current feasible schedule to generate a modified feasible schedule;
    optimizing the modified feasible schedule based on iteratively generating alternative modified feasible schedules by modifying schedules for pairs of ships;
    determining an objective function value for the optimized modified feasible schedule, and
    selecting the current feasible schedule or the optimized modified feasible schedule as the current feasible schedule based on the objective function values of the current feasible schedule and the optimized modified feasible schedule.

* * * * *